(12) United States Patent
Ohigashi (10) Patent No.: US 11,142,889 B2
(45) Date of Patent: Oct. 12, 2021

(54) WORK MACHINE AND METHOD OF CONTROLLING WORK MACHINE

(71) Applicant: KOMATSU LTD., Tokyo (JP)

(72) Inventor: Koji Ohigashi, Tokyo (JP)

(73) Assignee: KOMATSU LTD., Tokyo (JP)

( * ) Notice: Subject to any disclaimer, the term of this patent is extended or adjusted under 35 U.S.C. 154(b) by 299 days.

(21) Appl. No.: 16/087,776

(22) PCT Filed: Dec. 1, 2017

(86) PCT No.: PCT/JP2017/043315
§ 371 (c)(1),
(2) Date: Sep. 24, 2018

(87) PCT Pub. No.: WO2019/106831
PCT Pub. Date: Jun. 6, 2019

(65) Prior Publication Data
US 2020/0307367 A1 Oct. 1, 2020

(51) Int. Cl.
*E02F 9/22* (2006.01)
*E02F 9/20* (2006.01)
(Continued)

(52) U.S. Cl.
CPC .......... *E02F 9/2235* (2013.01); *E02F 9/2004* (2013.01); *E02F 9/2292* (2013.01); *E02F 9/2296* (2013.01); *F04B 1/29* (2013.01); *F04B 49/06* (2013.01); *F15B 11/02* (2013.01); *E02F 3/32* (2013.01); *E02F 9/2285* (2013.01)

(58) Field of Classification Search
CPC .. F04B 1/29; F04B 49/065; F15B 2211/6333; E02F 9/2235; E02F 9/2004; E02F 9/2292
See application file for complete search history.

(56) References Cited

U.S. PATENT DOCUMENTS 5,177,964 A * 1/1993 Tanaka .................. F16H 61/421
60/445
2011/0048829 A1 3/2011 Matsumoto et al.
(Continued)

FOREIGN PATENT DOCUMENTS

DE 112016000101 B4 5/2019
JP H09-88902 A 3/1997
(Continued)

*Primary Examiner* — Abiy Teka
(74) *Attorney, Agent, or Firm* — Faegre Drinker Biddle & Reath LLP (57) ABSTRACT

A work machine includes first and second hydraulic motors, first and second hydraulic pumps provided to supply hydraulic oil in correspondence with the first and second hydraulic motors, respectively, first and second swash plate angle sensors provided in correspondence with swash plates which regulate amounts of delivery by the first and second hydraulic pumps, respectively, the first and second swash plate angle sensors each detecting an angle of the swash plate, a delivery amount setting unit which sets an ideal amount of delivery by the first and second hydraulic pumps, and a command value control unit which corrects a command value for adjusting an angle of the swash plate such that the amount of delivery in accordance with a result of detection by the first and second swash plate angle sensors is set to the ideal amount of delivery.

5 Claims, 10 Drawing Sheets

(51) Int. Cl.
- *F04B 1/29* (2020.01)
- *F04B 49/06* (2006.01)
- *F15B 11/02* (2006.01)
- *E02F 3/32* (2006.01)

(56) References Cited

U.S. PATENT DOCUMENTS

2015/0300270 A1* 10/2015 Murakami .............. F02D 29/04
  701/22
2018/0058041 A1    3/2018 Kamoshita et al.

FOREIGN PATENT DOCUMENTS

| | | |
|---|---|---|
| JP | 2006-46292 A | 2/2006 |
| JP | 2007-177635 A | 7/2007 |
| JP | 2008-303813 A | 12/2008 |
| JP | 2010-174980 A | 8/2010 |

* cited by examiner

WORK MACHINE AND METHOD OF CONTROLLING WORK MACHINE

TECHNICAL FIELD

The present invention relates to a work machine including a hydraulic pump and a method of controlling a work machine.

BACKGROUND ART

A work vehicle includes a hydraulic pump and a hydraulic motor and runs as the hydraulic motor is driven with hydraulic oil delivered from the hydraulic pump. A variable displacement hydraulic pump which can vary an amount of delivery with change in position of the swash plate is employed as the hydraulic pump.

In the work vehicle, a position of the swash plate is controlled by sensing with a hydraulic sensor, a control hydraulic pressure of a regulator which moves the swash plate or by sensing a command current to a proportional solenoid valve which controls a control hydraulic pressure (see PTLs 1 and 2).

An operator operates two travel control levers to drive hydraulic motors mounted on left and right traveling apparatuses, respectively. In an example in which hydraulic oil is supplied by different hydraulic pumps to left and right hydraulic motors, in order to ensure linear travel of a work vehicle, when amounts of operation of two travel control levers are equal, an amount of delivery of hydraulic oil supplied from the hydraulic pumps to the hydraulic motors is desirably equal between left and right sides.

An amount of delivery by the hydraulic pump in response to a command current, however, has hysteresis characteristics. In spite of the same amount of operation of travel control levers, due to the hysteresis characteristics of the hydraulic pump, amounts of delivery of hydraulic oil supplied by the hydraulic pumps to the hydraulic motors may be different between the left and right sides and deflection in travel may occur.

CITATION LIST

Patent Literature

PTL 1: Japanese Patent Laying-Open No. 2007-177635
PTL 2: Japanese Patent Laying-Open No. 2010-174980

SUMMARY OF INVENTION

Technical Problem

An object of the present disclosure is to provide a work machine capable of suppressing deflection in travel and a method of controlling a work machine.

Solution to Problem

A work machine according to one aspect includes first and second hydraulic motors, first and second hydraulic pumps provided to supply hydraulic oil in correspondence with the first and second hydraulic motors, respectively, first and second swash plate angle sensors provided in correspondence with swash plates which regulate amounts of delivery by the first and second hydraulic pumps, respectively, the first and second swash plate angle sensors each detecting an angle of the swash plate, a delivery amount setting unit which sets an ideal amount of delivery by the first and second hydraulic pumps, and a command value control unit which corrects a command value for adjusting an angle of the swash plate such that an amount of delivery in accordance with a result of detection by the first and second swash plate angle sensors is set to the ideal amount of delivery.

Advantageous Effects of Invention

The work machine and the method of controlling a work machine can suppress deflection in travel.

DESCRIPTION OF EMBODIMENTS

An embodiment of the present invention will be described below with reference to the drawings. The same elements in the description below have the same reference characters allotted and their labels and functions are also the same. Therefore, detailed description thereof will not be repeated. In the description below, terms "up", "down", "front", "rear", "left", and "right" are used with an operator seated at an operator's seat being defined as the reference.

<Overall Construction of Work Machine>

Figure 1:
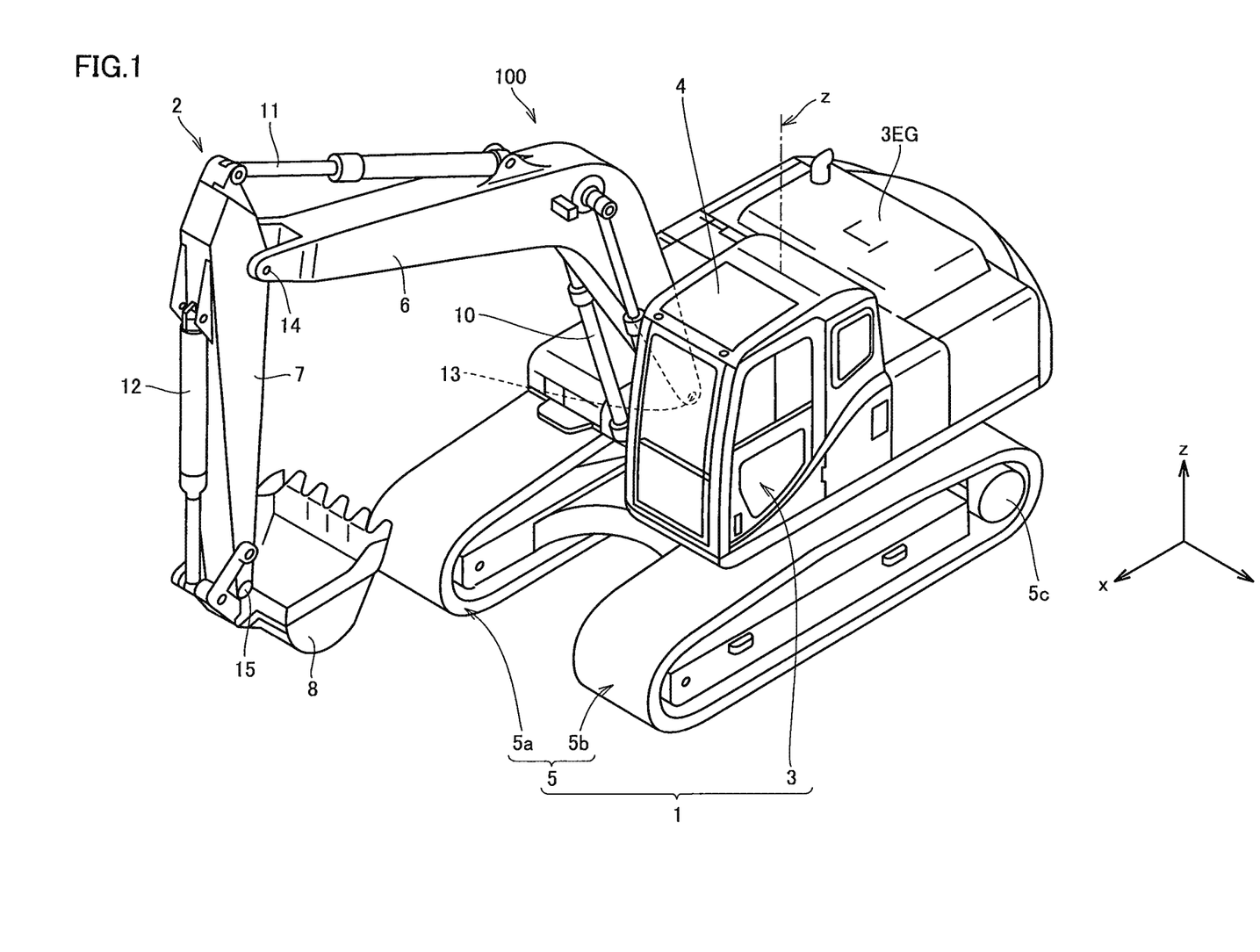
FIG. 1 is a perspective view of a work machine based on an embodiment.

FIG. 1 is a perspective view of a work machine based on an embodiment.

As shown in FIG. 1, a hydraulic excavator 100 representing a work machine includes a vehicular main body 1 and a work implement 2.

Vehicular main body 1 includes an upper revolving unit 3 representing a revolving unit and a traveling apparatus 5 as a travel unit. Upper revolving unit 3 accommodates an apparatus such as an internal combustion engine as a power generator and a hydraulic pump in an engine compartment 3EG. Engine compartment 3EG is arranged on one end side of upper revolving unit 3.

In the embodiment, in hydraulic excavator 100, for example, a diesel engine is employed as the internal combustion engine as the power generator, however, the power generator is not limited as such.

The power generator of hydraulic excavator 100 may be, for example, a hybrid apparatus in which an internal combustion engine, a generator-motor, and a power storage device are combined.

The power generator of hydraulic excavator 100 may be combination of a power storage device and a generator-motor without including an internal combustion engine.

Figure 2:
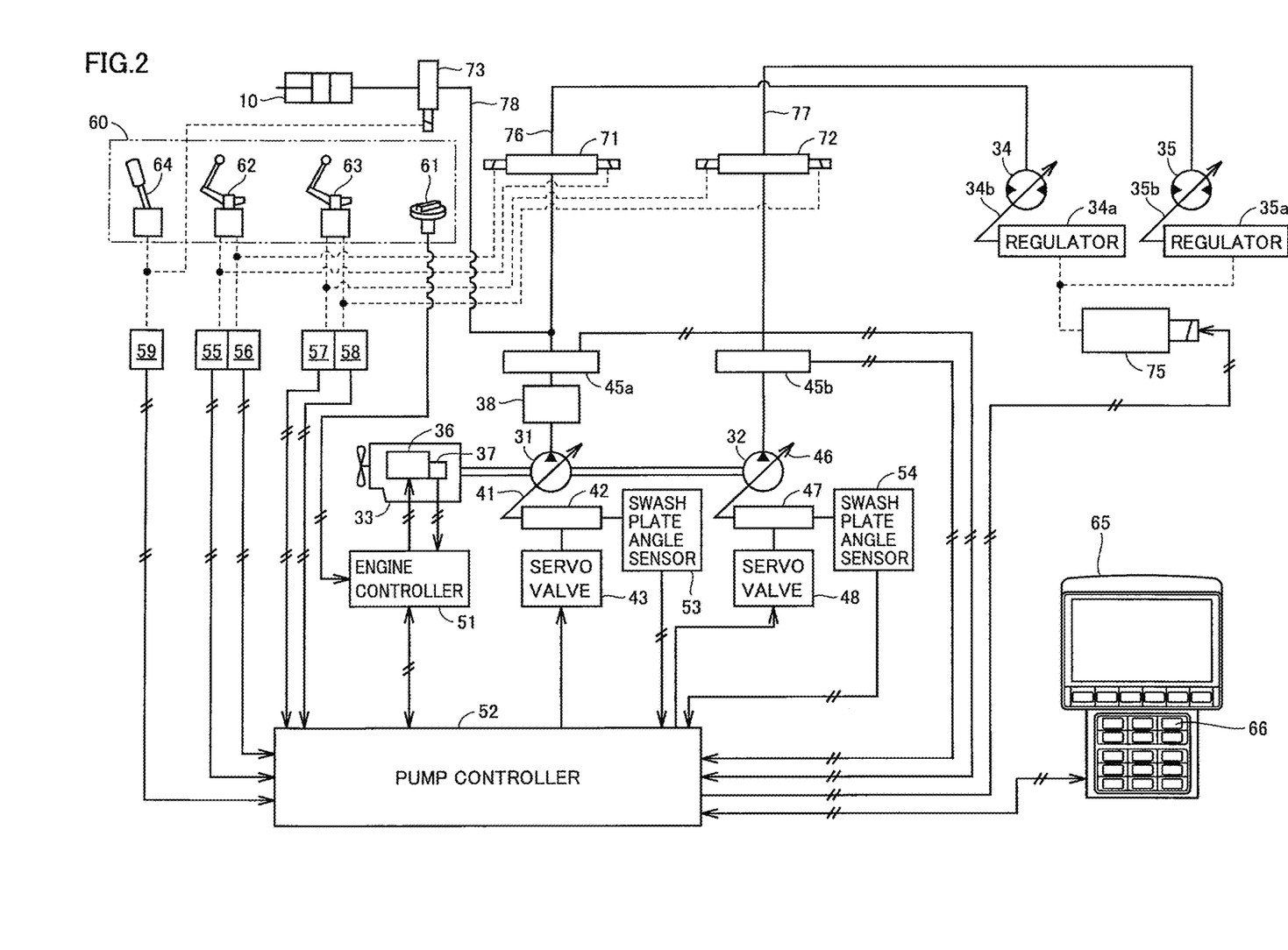
FIG. 2 is a diagram illustrating a configuration of a hydraulic system included in a hydraulic excavator 100 based on the embodiment.

Upper revolving unit 3 includes an operator's cab 4. Operator's cab 4 is provided on the other end side of upper revolving unit 3. Operator's cab 4 is provided opposite to a side where engine compartment 3EG is arranged. In operator's cab 4, a machine monitor 65 and an operation apparatus 60 shown in FIG. 2 are arranged. A handrail is attached above upper revolving unit 3.

Traveling apparatus 5 includes crawler belts 5a and 5b. Traveling apparatus 5 runs hydraulic excavator 100 as one or both of hydraulic motors provided on left and right sides rotationally drive(s) crawler belts 5a and 5b. Work implement 2 is attached lateral to operator's cab 4 in upper revolving unit 3.

In the present example, hydraulic motors are provided independently for crawler belts 5a and 5b. Traveling apparatus 5 includes a right traveling apparatus constituted of crawler belt 5a and a hydraulic motor and a left traveling apparatus constituted of crawler belt 5b and a hydraulic motor.

Hydraulic excavator 100 may include a traveling apparatus which includes tires instead of crawler belts 5a and 5b and can run by transmitting driving force from an engine to the tires through a transmission. A wheeled hydraulic excavator represents an exemplary hydraulic excavator 100 in such a form.

Hydraulic excavator 100 may be, for example, a backhoe loader.

A side where work implement 2 and operator's cab 4 are arranged is defined as the front of upper revolving unit 3, and a side where engine compartment 3EG is arranged is defined as the rear of the upper revolving unit. The left side when one faces front is defined as the left of upper revolving unit 3, and the right side when one faces front is defined as the right of upper revolving unit 3. A lateral direction of upper revolving unit 3 is also referred to as a direction of width. A side of traveling apparatus 5 of hydraulic excavator 100 or vehicular main body 1 is defined as a downward direction with upper revolving unit 3 being defined as the reference, and a side of upper revolving unit 3 with traveling apparatus 5 being defined as the reference is defined as an upward direction. A fore/aft direction of hydraulic excavator 100 is defined as an x direction, the direction of width is defined as a y direction, and an up/down direction is defined as a z direction. When hydraulic excavator 100 is provided on a horizontal plane, a side in a direction of action of the gravity or a vertical direction is defined as a lower side, and a side opposite in the vertical direction is defined as an upper side.

Work implement 2 includes a boom 6, an arm 7, a bucket 8 representing a work instrument, a boom cylinder 10, an arm cylinder 11, and a bucket cylinder 12. A base end portion of boom 6 is attached to a front portion of vehicular main body 1 with a boom pin 13 being interposed. A base end portion of arm 7 is attached to a tip end portion of boom 6 with an arm pin 14 being interposed. Bucket 8 is attached to a tip end portion of arm 7 with a bucket pin 15 being interposed. Bucket 8 moves around bucket pin 15. In bucket 8, teeth are attached on a side opposite to bucket pin 15. A cutting edge means a tip end of the tooth.

Bucket 8 does not have to include teeth. A bucket may include no tooth as shown in FIG. 1 but may include a cutting edge which is formed into a linear shape from a steel plate. Work implement 2 may include, for example, a tilt bucket including a single tooth. The tilt bucket is a bucket which includes a bucket tilt cylinder, can freely shape or grade a slope or a flat land as a result of lateral tilting and inclination of the bucket even when the hydraulic excavator is located on an inclined ground, and can also perform surface compaction with the use of a baseplate. In addition, work implement 2 may include a slope bucket or an attachment for rock drilling including a rock drilling chip as a work instrument instead of bucket 8.

Boom cylinder 10, arm cylinder 11, and bucket cylinder 12 shown in FIG. 1 are each a hydraulic cylinder driven by a pressure of hydraulic oil (which is referred to as a hydraulic pressure below as appropriate). Boom cylinder 10 drives boom 6 to thereby raise and lower the boom. Arm cylinder 11 drives arm 7 to thereby operate the arm around arm pin 14. Bucket cylinder 12 drives bucket 8 to thereby operate the bucket around bucket pin 15.

A direction control valve is provided between the hydraulic cylinder such as boom cylinder 10, arm cylinder 11, and bucket cylinder 12 and hydraulic pumps 31 and 32 shown in FIG. 2. The direction control valve controls a flow rate of hydraulic oil supplied from hydraulic pumps 31 and 32 to boom cylinder 10, arm cylinder 11, and bucket cylinder 12, and changes a direction of flow of the hydraulic oil. The direction control valve includes a travel direction control valve for driving a travel motor and a work implement direction control valve for controlling a stewing motor which revolves boom cylinder 10, arm cylinder 11, bucket cylinder 12, and upper revolving unit 3.

<Configuration of Hydraulic System>

FIG. 2 is a diagram illustrating a configuration of a hydraulic system included in hydraulic excavator 100 based on the embodiment.

As shown in FIG. 2, the hydraulic system is configured such that hydraulic pumps 31 and 32 are driven by an engine 33 and hydraulic oil delivered from a pair of hydraulic pumps 31 and 32 is supplied and ejected to and from such hydraulic actuators as boom cylinder 10, arm cylinder 11, bucket cylinder 12, a pair of hydraulic motors 34 and 35, and a slewing motor through various control valves.

As supply and release of a hydraulic pressure to and from hydraulic actuators are controlled, an operation of work implement 2, revolution of the revolving unit, and a traveling operation by the travel unit are controlled. FIG. 2 shows only boom cylinder 10 among hydraulic cylinders of work implement 2 and does not show arm cylinder 11 and bucket cylinder 12.

A diesel engine is adopted as engine 33, and output from engine 33 is controlled as an amount of injected fuel from a fuel injection apparatus 36 is regulated. The amount of injected fuel is regulated by control of fuel injection apparatus 36 by an engine controller 51. An actual speed of engine 33 is detected by a speed sensor 37 and a detection signal therefrom is input to engine controller 51 and a pump controller 52.

The pair of hydraulic pumps 31 and 32 is driven by engine 33 and delivers hydraulic oil. The pair of hydraulic pumps 31 and 32 includes a first hydraulic pump 31 and a second hydraulic pump 32.

First hydraulic pump 31 is a variable displacement hydraulic pump which varies a flow rate with variation in tilting angle (which is simply called an "angle" below) of a swash plate 41. A servo piston 42 is coupled to swash plate 41, and an angle of swash plate 41 is varied as servo piston 42 is driven. A flow rate of first hydraulic pump 31 is thus controlled. A hydraulic pressure for driving servo piston 42 is controlled by a servo valve 43. Servo valve 43 controls a hydraulic pressure supplied to servo piston 42 in accordance with an amount of a current output from pump controller 52.

A delivery pressure (which is called a "pump pressure" below) of first hydraulic pump 31 is detected by a pump pressure sensor 45a and a detection signal therefrom is input to pump controller 52. A pressure of hydraulic oil delivered from first hydraulic pump 31 is reduced to a certain pressure by a self-pressure reducing valve 38 and supplied as a pilot for various control valves.

An angle of swash plate 41 is sensed by a swash plate angle sensor 53.

Servo piston 42 is moved in an axial direction by a hydraulic pressure supplied from servo valve 43. A locker cam is coupled to servo piston 42, and locker cam rotates with movement of servo piston 42 in the axial direction. Swash plate 41 is coupled to locker cam, and an angle of swash plate 41 is varied with rotation of locker cam.

Swash plate angle sensor 53 senses an angle of swash plate 41. An angle of swash plate 41 sensed by swash plate angle sensor 53 is input to pump controller 52 as a sensing signal.

Second hydraulic pump 32 is a variable displacement hydraulic pump which varies a flow rate with variation in angle of a swash plate 46. Second hydraulic pump 32 is similar in construction to first hydraulic pump 31.

A servo piston 47, a servo valve 48, and a swash plate angle sensor 54 annexed to second hydraulic pump 32 are similar in construction to servo piston 42, servo valve 43, and swash plate angle sensor 53 annexed to first hydraulic pump 31.

A pump pressure of second hydraulic pump 32 is detected by a pump pressure sensor 45b and a detection signal therefrom is input to pump controller 52.

The pair of hydraulic motors 34 and 35 is driven by hydraulic oil delivered from first hydraulic pump 31 and second hydraulic pump 32. As described above, the pair of hydraulic motors 34 and 35 includes a first hydraulic motor 34 and a second hydraulic motor 35. First hydraulic motor 34 drives the right traveling apparatus. Second hydraulic motor 35 drives the left traveling apparatus.

A control valve is controlled in accordance with an operation of operation apparatus 60 which will be described later and controls a hydraulic pressure supplied to each hydraulic actuator. The control valve includes a first motor control valve 71, a second motor control valve 72, a work implement control valve 73, and a travel speed switching valve 75.

First motor control valve 71 is provided in a first flow path 76 which connects first hydraulic pump 31 and first hydraulic motor 34 to each other. First motor control valve 71 controls a flow rate and a direction of supply of hydraulic oil supplied to first hydraulic motor 34 in accordance with a supplied pilot pressure.

Second motor control valve 72 is provided in a second flow path 77 which connects second hydraulic pump 32 and second hydraulic motor 35 to each other. Second motor control valve 72 controls a flow rate and a direction of supply of hydraulic oil supplied to second hydraulic motor 35 in accordance with a supplied pilot pressure.

Work implement control valve 73 is provided in a third flow path 78 which is branched from first flow path 76 and connected to a hydraulic cylinder. Work implement control valve 73 controls a flow rate of hydraulic oil supplied to the hydraulic cylinder in accordance with a supplied pilot pressure.

Travel speed switching valve 75 controls regulators 34a and 35a in response to a control signal from pump controller 52. Regulators 34a and 35a are mechanisms which vary an angle of a swash plate 34b of first hydraulic motor 34 and an angle of a swash plate 35b of second hydraulic motor 35. Therefore, travel speed switching valve 75 controls angles of swash plates 34b and 35b of first hydraulic motor 34 and second hydraulic motor 35. Travel speed switching valve 75 is an electromagnetic valve controlled in response to a control signal from pump controller 52.

Control valves 71, 72, 73, 75 are controlled by an operator operating operation apparatus 60. Operation apparatus 60 is provided in an operator's cab 4 and includes a fuel dial 61, a pair of travel control levers 62 and 63, a work implement lever 64, and machine monitor 65.

Fuel dial 61 is a member operated by an operator for varying a speed of engine 33. Fuel dial 61 can be set in a plurality of levels from a maximum state to a minimum state. When fuel dial 61 is operated, a throttle signal in accordance with an amount of operation of fuel dial 61 is input to pump controller 52 through engine controller 51.

The pair of travel control levers 62 and 63 is a member operated by an operator for controlling travel of hydraulic excavator 100. Travel control levers 62 and 63 include a first travel control lever 62 and a second travel control lever 63.

When first travel control lever 62 is operated, a pilot pressure corresponding to an amount of operation thereof is supplied to first motor control valve 71. A flow rate of hydraulic oil to first hydraulic motor 34 is thus controlled and output of the right traveling apparatus is controlled. When second travel control lever 63 is operated, a pilot pressure corresponding to an amount of operation thereof is supplied to second motor control valve 72. A flow rate of hydraulic oil to second hydraulic motor 35 is thus controlled and output of the left traveling apparatus is controlled.

A direction of rotation of first hydraulic motor 34 is switched in accordance with a direction of operation of first travel control lever 62. A direction of rotation of second hydraulic motor 35 is switched in accordance with a direction of operation of second travel control lever 63. Switching between forward travel and rearward travel of hydraulic excavator 100 is thus made.

As set forth above, an operator can control a traveling operation by hydraulic excavator 100 by operating the pair of travel control levers 62 and 63.

A pilot pressure corresponding to an amount of operation of first travel control lever 62 in a direction of forward travel is detected by a travel PPC pressure sensor 55. A pilot pressure corresponding to an amount of operation of first travel control lever 62 in a direction of rearward travel is detected by a travel PPC pressure sensor 56. A pilot pressure corresponding to an amount of operation of second travel control lever 63 in the direction of forward travel is detected by a travel PPC pressure sensor 57. A pilot pressure corresponding to an amount of operation of second travel control lever 63 in the direction of rearward travel is detected by a travel PPC pressure sensor 58. Pilot pressures detected by travel PPC pressure sensors 55 to 58 are input to pump controller 52 as detection signals.

Work implement lever 64 is a member operated by an operator for operating work implement 2. When work implement lever 64 is operated, a pilot pressure corresponding to an operation content is supplied to work implement control valve 73. A hydraulic pressure supplied to boom cylinder 10, arm cylinder 11, bucket cylinder 12, and the slewing motor is thus controlled, and an operation by work implement 2 and a revolving operation by upper revolving unit 3 are controlled. A pilot pressure corresponding to an operation content of work implement lever 64 (a pilot pressure supplied to work implement control valve 73) is detected by a work implement PPC pressure sensor 59 and a detection signal therefrom is input to pump controller 52.

Machine monitor 65 receives various signals from pump controller 52 and shows various types of information such as an amount of fuel and a water temperature. Machine monitor 65 includes an operation button for entry of various types of setting of hydraulic excavator 100, and a work mode can be selected, for example, through machine monitor 65. The work mode includes, for example, a mode in which high output is prioritized and a mode in which fuel efficiency is prioritized.

The operation button on machine monitor 65 includes a travel speed switch 66. Travel speed switch 66 is operated by an operator in order to change a travel speed mode. Travel speed switch 66 can be switched between a Hi state and a Low state. When travel speed switch 66 is set to the Hi state, travel speed switching valve 75 sets angles of swash plates 34b and 35b of first hydraulic motor 34 and second hydraulic motor 35 to angles appropriate for travel at a high speed. Angles of swash plates 34b and 35b are set to lower a volume of first hydraulic motor 34 and second hydraulic motor 35. When travel speed switch 66 is set to the Low state, travel speed switching valve 75 sets angles of swash plates 34b and 35b of first hydraulic motor 34 and second hydraulic motor 35 to angles appropriate for travel at a low speed. Angles of swash plates 34b and 35b are set to increase a volume of first hydraulic motor 34 and second hydraulic motor 35.

Engine controller 51 selects engine output torque characteristics in accordance with a throttle signal from fuel dial 61 and a set work mode, and controls fuel injection apparatus 36 based on the selected engine output torque characteristics.

Pump controller 52 controls pump absorption torque of hydraulic pumps 31 and 32 by controlling angles of swash plates 41 and 46.

<Construction of Hydraulic Pump>

Figure 3:
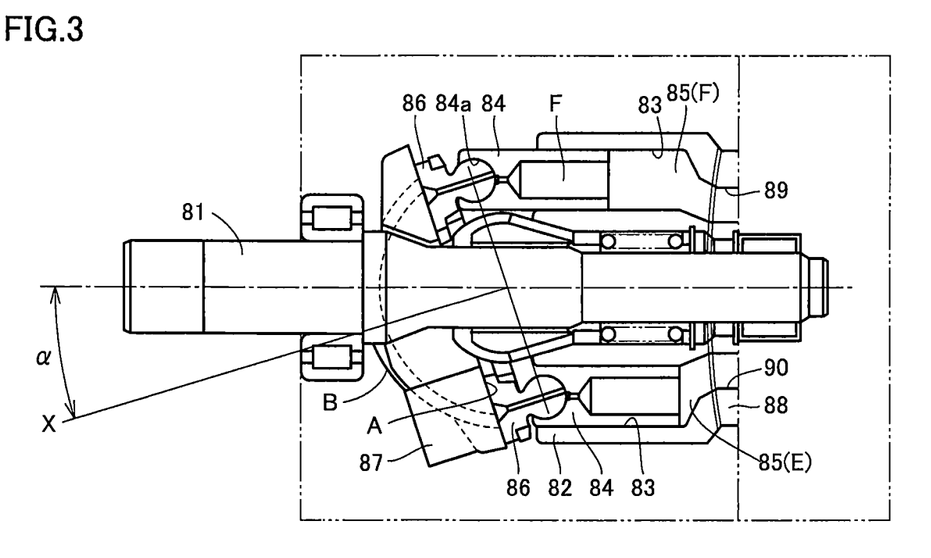
FIG. 3 is a diagram illustrating a construction of a hydraulic pump based on the embodiment.

FIG. 3 is a diagram illustrating a construction of the hydraulic pump based on the embodiment.

FIG. 3 shows a swash plate type piston pump as a hydraulic pump.

Such a piston pump has been known that a piston 84 is fitted into a cylinder hole 83 in a cylinder block 82 which rotates together with a shaft 81 to thereby define a chamber 85, a shoe 86 attached to piston 84 is slidable along a swash plate (locker cam) 87 so that a volume of chamber 85 is increased or decreased by reciprocating motion of piston 84 and a fluid is suctioned and delivered from a high-pressure port 89 and a low-pressure port 90 of a valve plate 88.

As cylinder block 82 rotates with shaft 81, shoe 86 slides with respect to a plane A. As locker cam 87 moves along a cylindrical surface B, an inclination α of a line X with respect to the axial direction of cylinder block 82 which is perpendicular to plane A of locker cam 87 and passes through a center of swing and rotation varies. α represents a swash plate angle.

While locker cam 87 is at swash plate angle α with respect to the axial direction of cylinder block 82, plane A functions as the cam with respect to shoe 86. Piston 84 thus performs sliding motion in cylinder hole 83 in cylinder block 82 and a difference is produced between volumes E and F in chamber 85 in cylinder block 82 so that suction and delivery by a difference F−E is performed.

As cylinder block 82 rotates and volume E of chamber 85 decreases, oil is delivered during that process. On the other hand, volume F of chamber 85 increases and oil is suctioned during that process.

<Construction of Operator's Cab>

Figure 4:
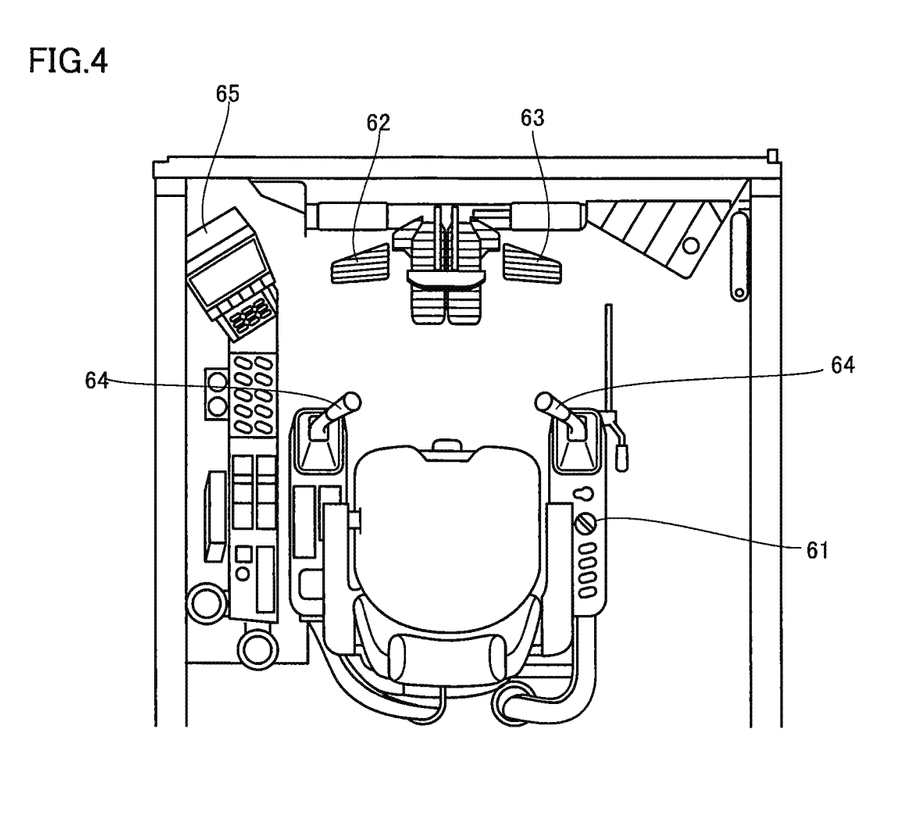
FIG. 4 is a diagram illustrating a construction of an operator's cab 4 based on the FIG. 5 is a diagram illustrating characteristics of the hydraulic pump based on the embodiment.

FIG. 4 is a diagram illustrating a construction of operator's cab 4 based on the embodiment.

As shown in FIG. 4, operation apparatus 60 which can be operated by an operator seated at an operator's seat is provided.

By way of example, first travel control lever 62 and second travel control lever 63 for controlling travel of hydraulic excavator 100 are provided in front of the operator's seat.

Work implement lever 64 is provided on left and right sides in the vicinity of the operator's seat. Work implement 2 is operated by operating work implement lever 64.

Machine monitor 65 is provided on a front left side, and work can be done while a content shown on machine monitor 65 is checked.

Fuel dial 61 is provided on the right side of the operator's seat.

<Characteristics of Hydraulic Pump>

Figure 5:
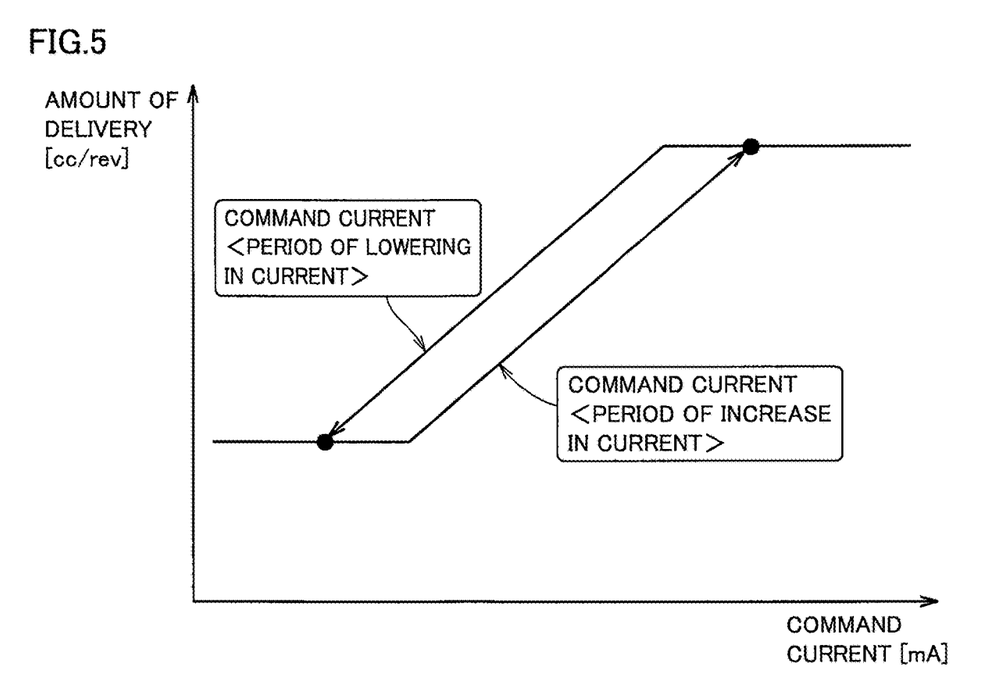

FIG. 5 is a diagram illustrating characteristics of the hydraulic pump based on the embodiment.

As shown in FIG. 5, since the hydraulic pump is a swash plate type piston pump, it has hysteresis characteristics. In this regard, an amount of delivery of hydraulic oil from the hydraulic pump is different between a period of increase in command current and a period of lowering in command current.

Specifically, even when a value of a command current is the same, an amount of delivery for the current value during a period of lowering in command current is greater than an amount of delivery for the current value during a period of increase in command current.

From a different point of view, when a certain amount of delivery of the hydraulic oil from the hydraulic pump is set, a current value during the period of increase in command current should be set to be greater than a current value during the period of lowering in command current.

In the present embodiment, in order to suppress deviation of the amount of delivery due to the hysteresis characteristics, an adjustment table is generated.

Figure 6:
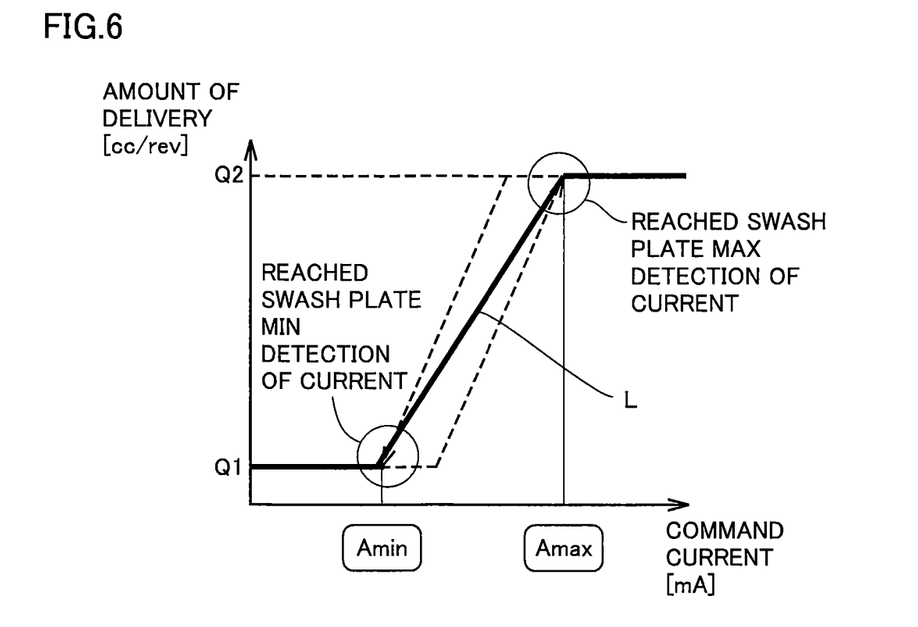
FIG. 6 is a diagram illustrating an adjustment table based on the embodiment.

FIG. 6 is a diagram illustrating an adjustment table based on the embodiment.

As shown in FIG. 6, a command current value Amax when a maximum angle of inclination of the swash plate is reached during the period of increase in command current is detected. A command current value Amin when a minimum angle of inclination of the swash plate is reached during the period of lowering in command current is detected. For the swash plate, an amount of delivery Q2 when the maximum angle of inclination is reached and an amount of delivery Q1 when the minimum angle of inclination is reached are shown.

Thus, an adjustment line L can be set by connecting command current Amin, amount of delivery Q1, command current Amax, and amount of delivery Q2.

In the present example, the hydraulic pump is controlled based on adjustment line L.

In the present example, command current value Amax at the time when the maximum angle of inclination of the swash plate is reached during the period of increase in current is detected. Command current value Amin at the time when the minimum angle of inclination of the swash plate is reached during the period of lowering in current is detected.

Some margin can also be set. Specifically, a value offset by a prescribed amount α after the maximum angle of inclination of the swash plate is reached during the period of increase in command current may be detected as command current value Amax, or a value offset by a prescribed amount β after the minimum angle of inclination of the swash plate may be reached during the period of lowering in command current may be detected as command current value Amin. Adjustment line L can be set also based on that data.

By using adjustment line L, deviation by hysteresis characteristics can be suppressed.

Figure 7:
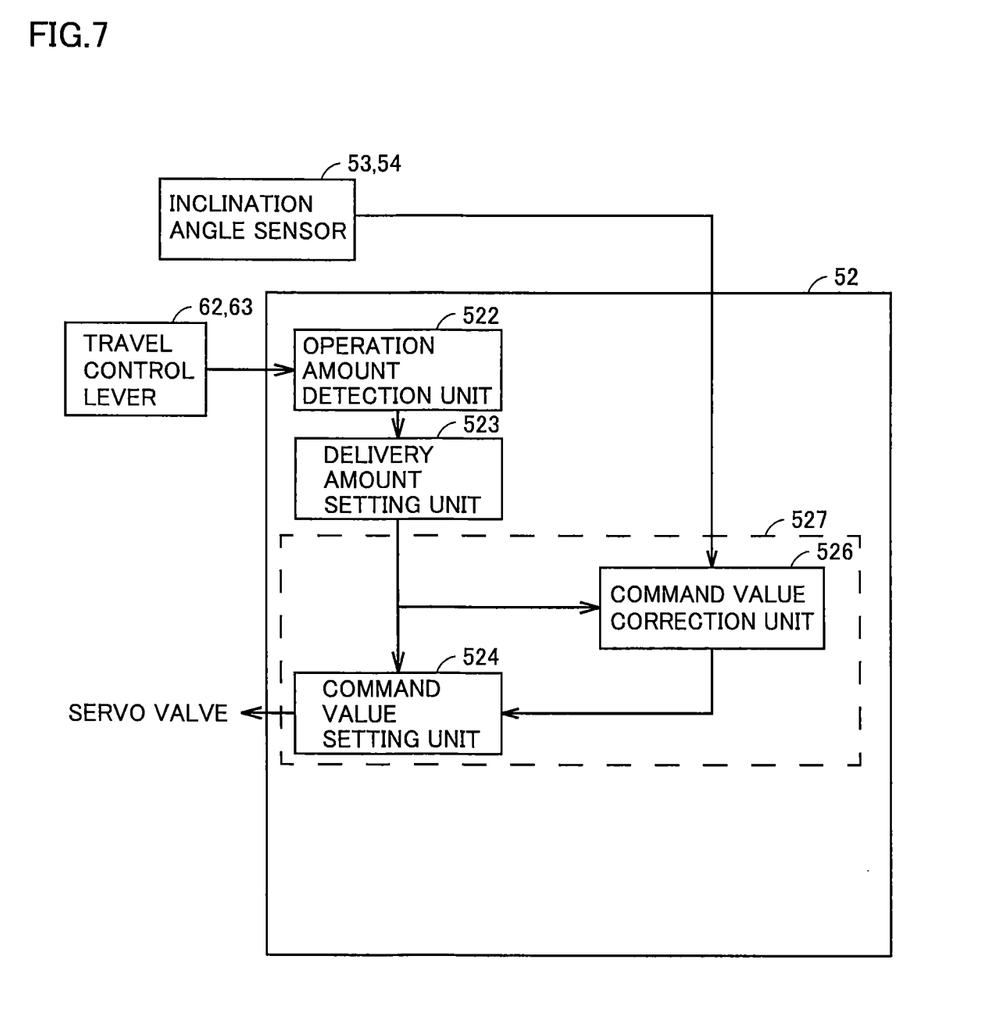
FIG. 7 is a diagram illustrating a function of a pump controller 52 which controls the hydraulic pump based on the embodiment.

FIG. 7 is a diagram illustrating a function of pump controller 52 which controls the hydraulic pump based on the embodiment.

In FIG. 7, pump controller 52 includes a command value control unit 527, an operation amount detection unit 522, and a delivery amount setting unit 523.

Operation amount detection unit 522 detects an amount of operation of each of first and second travel control levers 62 and 63.

Delivery amount setting unit 523 sets an ideal amount of delivery based on the amount of operation of the travel control lever detected by operation amount detection unit 522.

Command value control unit 527 corrects a command current such that an amount of delivery set by delivery amount setting unit 523 is achieved, and outputs the command current to servo valves 43 and 48.

Command value control unit 527 includes a command value setting unit 524 and a command value correction unit 526.

Command value setting unit 524 sets a command value based on a target (ideal) amount of delivery set by delivery amount setting unit 523.

Though an example in which delivery amount setting unit 523 sets an ideal amount of delivery based on an amount of operation of the travel control lever detected by operation amount detection unit 522 is described in the present example, an ideal amount of delivery may be set without depending on an amount of operation of the travel control lever. An ideal amount of delivery can also be set, for example, based on a state of operation of a vehicle (an internal control parameter). An ideal amount of delivery can be set also based on combination of an amount of operation of the travel control lever and a state of operation of the vehicle.

Figure 8:
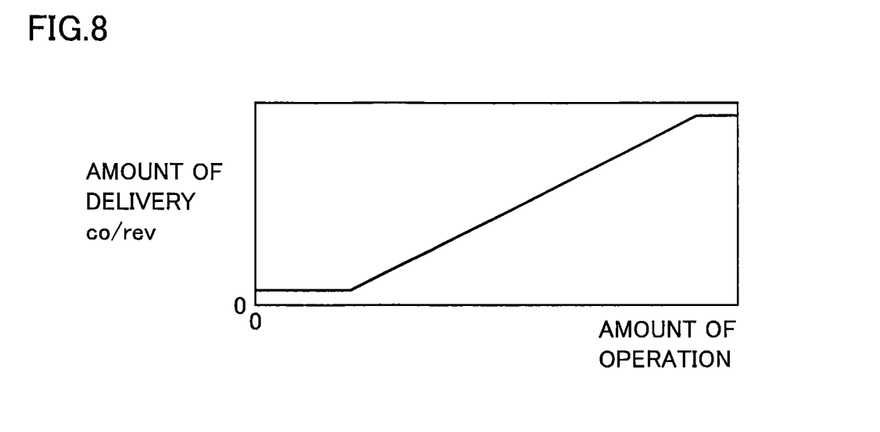
FIG. 8 is a diagram illustrating relation between an amount of operation of a travel control lever and an amount of delivery based on the embodiment.

FIG. 8 is a diagram illustrating relation between an amount of operation of a travel control lever and an amount of delivery based on the embodiment.

As shown in FIG. 8, as an amount of operation of the travel control lever is greater, an amount of delivery from the hydraulic pump increases. An amount of operation of the travel control lever being 0 means that the travel control lever is at a neutral position.

Command value setting unit 524 sets a command current by using the adjustment table described with reference to FIG. 6 so as to achieve the amount of delivery from the hydraulic pump shown in FIG. 8 which is in accordance with the amount of operation of first and second travel control levers 62 and 63 detected by operation amount detection unit 522.

Command value setting unit 524 outputs the set command current to servo valves 43 and 48.

Servo valves 43 and 48 control hydraulic pressures to be supplied to servo pistons 42 and 47, respectively, based on a command current output from command value setting unit 524. As servo piston 42 moves in the axial direction, an angle of swash plate 41 is adjusted. As servo piston 47 moves in the axial direction, an angle of swash plate 46 is adjusted. An amount of delivery of hydraulic oil from first hydraulic pump 31 is adjusted based on the angle of swash plate 41. An amount of delivery of hydraulic oil from second hydraulic pump 32 is adjusted based on the angle of swash plate 46.

Swash plate angle sensor 53 detects an angle of swash plate 41 and outputs a detection signal to pump controller 52. Swash plate angle sensor 54 detects an angle of swash plate 46 and outputs a detection signal to pump controller 52.

Command value correction unit 526 calculates an actual amount of delivery of hydraulic oil based on detection signals from swash plate angle sensors 53 and 54.

Command value correction unit 526 compares an actual amount of delivery of hydraulic oil based on the detection signals from swash plate angle sensors 53 and 54 with a target amount of delivery of hydraulic oil in accordance with an amount of operation of first and second travel control levers 62 and 63 shown in FIG. 8, and instructs command value setting unit 524 to correct the command current.

Specifically, when command value correction unit 526 compares an actual amount of delivery of hydraulic oil with a target amount of delivery of hydraulic oil in accordance with an amount of operation'of first and second travel control levers 62 and 63 shown in FIG. 8 and the actual amount of delivery of the hydraulic oil is smaller than the target amount of delivery of hydraulic oil, it corrects the command current to increase. When command value correction unit 526 compares an actual amount of delivery of hydraulic oil with a target amount of delivery of hydraulic oil in accordance with an amount of operation of first and second travel control levers 62 and 63 shown in FIG. 8 and the actual amount of delivery of hydraulic oil is greater than the target amount of delivery of hydraulic oil, it corrects the command current to decrease.

Command value correction unit 526 carries out feedback control to correct the command current based on detection signals from swash plate angle sensors 53 and 54.

Though command value correction unit 526 in command value control unit 527 instructs command value setting unit 524 to correct a command current in the present embodiment, command value correction unit 526 may correct the command current set by command value setting unit 524. In this case, command value correction unit 526 is present in command value control unit 527 in a stage subsequent to command value setting unit 524.

Figure 9:
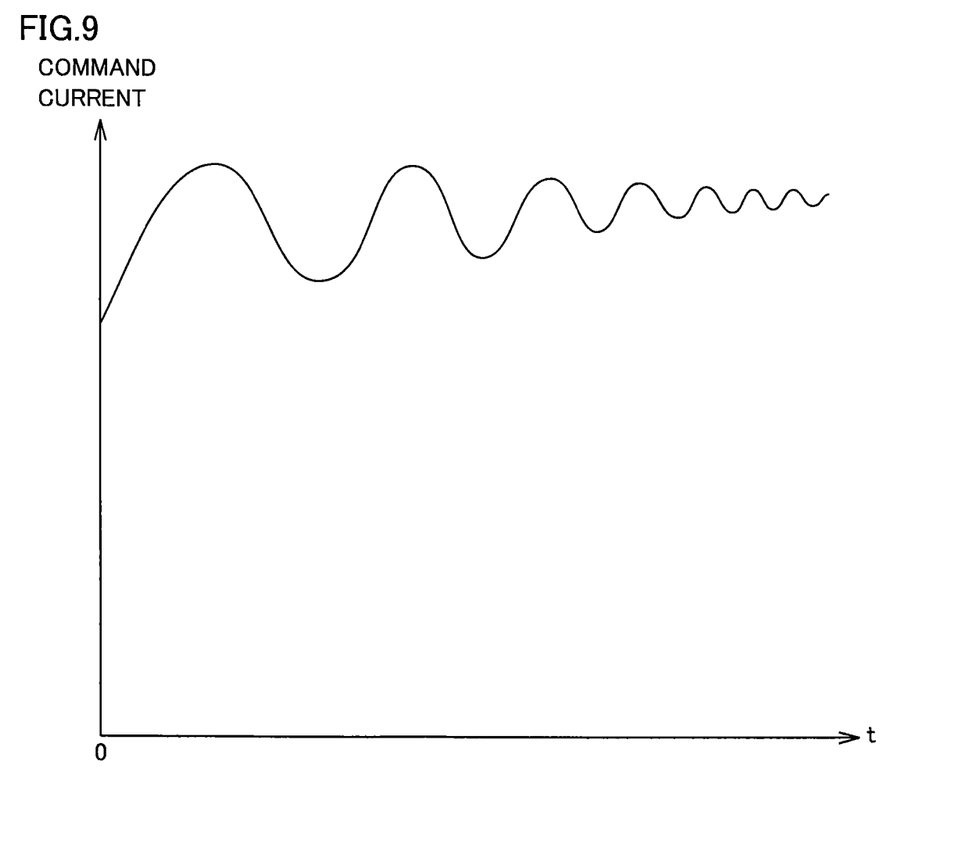
FIG. 9 is a diagram illustrating one example of a command current output from a command value setting unit 524 to a servo valve based on the embodiment.

FIG. 9 is a diagram illustrating one example of a command current output from current setting unit 524 to a servo valve based on the embodiment.

When an actual amount of delivery of hydraulic oil by a pump having hysteresis characteristics in FIG. 5 is greater than a target amount of delivery of hydraulic oil, command value correction unit 526 corrects the command current to decrease. Thus, as shown in FIG. 9, the command current has a constant periodic signal waveform in which an amplitude of a period converges over time.

With such a scheme, an amount of delivery from first hydraulic pump 31 and second hydraulic pump 32 can accurately be regulated to a target amount of delivery of hydraulic oil. The hydraulic pump can highly accurately be controlled.

In the embodiment, an operator operates first travel control lever 62 to drive the left traveling apparatus. The operator operates second travel control lever 63 to drive the right traveling apparatus. When the operator sets an equal amount of operation for first travel control lever 62 and second travel control lever 63, an amount of delivery of hydraulic oil supplied from the hydraulic pumps to the hydraulic motors is equal between the left and right sides and an amount of drive is equal.

Conventionally, an amount of delivery of hydraulic oil supplied from hydraulic pumps to hydraulic motors may be different between the left and right sides in spite of an equal amount of operation, depending on a condition of operation of travel control levers due to the hysteresis characteristics of the hydraulic pump. Therefore, deflection in travel may occur.

With the scheme based on the embodiment, an amount of delivery of hydraulic oil delivered from a hydraulic pump can accurately be regulated. Therefore, since an amount of delivery of hydraulic oil is equal between the left and right sides, an amount of drive is equal, deflection in travel can be suppressed, and linear travel can be achieved.

A construction in which a travel communication valve is provided for allowing communication between hydraulic circuits so as to supply an equal amount of hydraulic oil to left and right hydraulic pumps of traveling apparatus 5 for suppression of deflection in travel has also conventionally been adopted. Then, the number of components has increased and energy loss in a hydraulic motor has been caused by the travel communication valve.

With the scheme based on the embodiment, the number of components can be reduced and energy loss in a hydraulic motor can also be eliminated. Therefore, efficient travel can be achieved.

Though a configuration for controlling two hydraulic pumps is described above, control of more hydraulic pumps is also similarly applicable.

Figure 10:
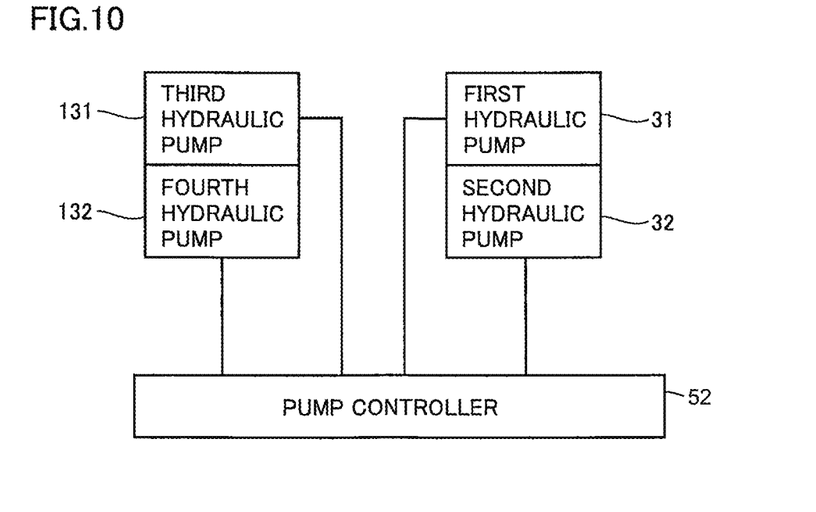
FIG. 10 is a diagram illustrating control of hydraulic pumps based on a modification of the embodiment.

FIG. 10 is a diagram illustrating control of hydraulic pumps based on a modification of the embodiment.

FIG. 10 shows a pump controller 52 # which controls four hydraulic pumps used in a large hydraulic excavator.

By way of example, first hydraulic pump 31 and second hydraulic pump 32 as well as a third hydraulic pump 131 and a fourth hydraulic pump 132 are provided.

Pump controller 52 # controls first hydraulic pump 31, second hydraulic pump 32, third hydraulic pump 131, and fourth hydraulic pump 132.

Specifically, when only the travel control lever is operated (the work implement lever or the like is not operated), first to fourth hydraulic pumps 31, 32, 131, and 132 are used for driving traveling apparatus 5.

By way of example, hydraulic oil is supplied to hydraulic motor 34 by first hydraulic pump 31 and third hydraulic pump 131. Hydraulic oil is supplied to hydraulic motor 35 by second hydraulic pump 32 and fourth hydraulic pump 132.

When work implement 2 is operating (the work implement lever or the like is operated), third and fourth hydraulic pumps 131 and 132 supply hydraulic oil for driving work implement 2. First and second hydraulic pumps 31 and 32 supply hydraulic oil for driving traveling apparatus 5.

Pump controller 52 # controls each hydraulic pump under the scheme above and accurately regulates an amount of delivery of hydraulic oil.

Conventionally, in spite of an equal amount of operation, an amount of delivery of hydraulic oil by hydraulic pumps to hydraulic motors may be different between the left and right sides depending on a condition of operation of the travel control lever due to the hysteresis characteristics of the hydraulic pump.

In particular when a plurality of hydraulic pumps supply hydraulic oil to hydraulic motors, variation is great and deflection in travel may occur.

With the scheme based on the embodiment, an amount of delivery of hydraulic oil from each hydraulic pump can accurately be regulated. Therefore, when a plurality of hydraulic pumps supply hydraulic oil to hydraulic motors, an amount of delivery of hydraulic oil is equal between the left and right sides, an amount of drive is equal, deflection in travel can be suppressed, and linear travel can be achieved.

Though a hydraulic pump which supplies hydraulic oil to a hydraulic motor of a traveling apparatus is mainly described above, supply of hydraulic oil to a hydraulic motor of another apparatus is also similarly applicable without being limited to the traveling apparatus. Any hydraulic actuator such as a hydraulic cylinder is applicable without being limited to the hydraulic motor.

<Electrical Operation Lever>

Though operation apparatus 60 includes a pilot hydraulic control lever in the embodiment, it may include an electrical control lever. When the control lever is electrical, an amount of operation thereof is detected by a potentiometer. The amount of operation of the control lever detected by the potentiometer is obtained by pump controller 52.

Pump controller 52 which detects a signal indicating an operation of the electrical control lever carries out control as in the pilot hydraulic type.

Though work implement 2 includes boom 6, arm 7, and bucket 8, an attachment to be attached to work implement 2 is not limited thereto and not limited to bucket 8. The work machine should only include a work implement and is not limited to hydraulic excavator 100.

The embodiment disclosed herein is illustrative and not restricted to the disclosure above. The scope of the present invention is defined by the terms of the claims and is intended to include any modifications within the scope and meaning equivalent to the terms of the claims.

REFERENCE SIGNS LIST

1 vehicular main body; 2 work implement; 3 upper revolving unit; 3EG engine compartment; 4 operator's cab; 5 traveling apparatus; 5a, 5b crawler belt; 6 boom; 7 arm; 8 bucket; 8B tooth; 10 boom cylinder; 11 arm cylinder; 12 bucket cylinder; 13 boom pin; 14 arm pin; 15 bucket pin; 52 pump controller; 53, 54 inclination angle sensor; 60 operation apparatus; 522 operation amount detection unit; 523 delivery amount setting unit; 524 command value setting unit; 526 command value correction unit; and 527 command value control unit.

The invention claimed is:
1. A work machine comprising:
first and second hydraulic motors;
first and second hydraulic pumps provided to supply hydraulic oil in correspondence with the first and second hydraulic motors, respectively;
first and second swash plate angle sensors provided in correspondence with swash plates which regulate amounts of delivery by the first and second hydraulic pumps, respectively, the first and second swash plate angle sensors each detecting an angle of the swash plate;
a delivery amount setting unit which sets an ideal amount of delivery by the first and second hydraulic pumps; and a command value control unit which corrects a command value for adjusting an angle of the swash plate based on a predefine relationship between the command value for adjusting the angle of the swash plate and an amount of delivery such that the amount of delivery in accordance with a result of detection by the first and second swash plate angle sensors is set to the ideal amount of delivery, wherein the command value control unit includes:
- a command value setting unit which sets a command value for adjusting an angle of the swash plate, and
- a command value correction unit which corrects the command value set by the command value setting unit based on the predefine relationship between the command value for adjusting the angle of the swash plate and the amount of delivery such that the amount of delivery in accordance with the result of detection by the first and second swash plate angle sensors is set to the ideal amount of delivery, and wherein the command value correction unit corrects the command value by referring to a table which predefines the relationship between the command value for adjusting the angle of the swash plate and the amount of delivery.

2. The work machine according to claim 1, wherein the command value correction unit corrects the command value when the swash plate is at an angle between a maximum tilt angle and a minimum tilt angle.

3. The work machine according to claim 1, wherein the ideal amount of delivery by the first and second hydraulic pumps is set based on a state of operation of a travel control lever.

4. The work machine according to claim 1, wherein the first and second swash plate angle sensors each detect an angle between a maximum tilt angle and a minimum tilt angle of the swash plate.

5. A method of controlling a work machine, the work machine including first and second hydraulic pumps provided to supply hydraulic oil in correspondence with first and second hydraulic motors, respectively, first and second swash plate angle sensors provided in correspondence with swash plates which regulate amounts of delivery by the first and second hydraulic pumps, respectively, the first and second swash plate angle sensors each detecting an angle of the swash plate, and a delivery amount setting unit which sets an ideal amount of delivery by the first and second hydraulic pumps, the method comprising:

accepting a result of detection by the first and second swash plate angle sensors; and correcting a command value for adjusting an angle of the swash plate based on a predefine relationship between the command value for adjusting the angle of the swash plate and an amount of delivery such that the amount of delivery in accordance with the result of detection by the first and second swash plate angle sensors is set to the ideal amount of delivery, wherein correcting the command value for adjusting the angle of the swash plate includes:
- setting a command value for adjusting an angle of the swash plate, and
- correcting the set command value based on the predefine relationship between the command value for adjusting the angle of the swash plate and the amount of delivery such that the amount of delivery in accordance with the result of detection by the first and second swash plate angle sensors is set to the ideal amount of delivery, and wherein the command value is corrected by referring to a table which predefines the relationship between the command value for adjusting the angle of the swash plate and the amount of delivery.

* * * * *